United States Patent [19]
Mima et al.

[11] Patent Number: 4,910,547
[45] Date of Patent: Mar. 20, 1990

[54] LENS DRIVING SYSTEM FOR AUTOMATIC FOCUSING ZONE FOCUS CAMERA

[75] Inventors: Yujiro Mima; Akira Yamanaka, both of Osaka, Japan

[73] Assignee: Minolta Camera Kabushiki Kaisha, Osaka, Japan

[21] Appl. No.: 212,474

[22] Filed: Jun. 28, 1988

[30] Foreign Application Priority Data

Jun. 29, 1987 [JP] Japan .............................. 62-164199

[51] Int. Cl.4 .............................................. G03B 7/08
[52] U.S. Cl. .................................. 354/403; 354/195.1
[58] Field of Search .................... 354/403, 400, 195.1, 354/401, 402, 404–409; 350/255

[56] References Cited

U.S. PATENT DOCUMENTS 4,504,132 3/1985 Martin et al. .................... 354/195.1
4,509,840 4/1985 Johnson et al. ...................... 354/400
4,702,583 10/1987 Yoshino et al. ...................... 354/400

Primary Examiner—L. T. Hix
Assistant Examiner—David M. Gray
Attorney, Agent, or Firm—Burns, Doane, Swecker & Mathis

[57] ABSTRACT

A photographic camera in which a lens adjustable in two positions is focused automatically on subjects located within "near" and "far" distance range from the camera. The lens is normally positioned in one of the two positions and movable to the other of the two positions in response to a signal generated by an automatic focusing device upon the detection of the subject location in the focus range to which the other position corresponds, wherein it is characterized that the movement of the lens is automatically controlled by an electromagnetic device.

15 Claims, 3 Drawing Sheets

LENS DRIVING SYSTEM FOR AUTOMATIC FOCUSING ZONE FOCUS CAMERA

BACKGROUND OF THE INVENTION

1. Field of the Invention

The present invention generally relates to a lens driving system of a photographic camera, and more particularly to the system for automatic focusing zone focus camera adjustable in two zones, having an automatic focusing apparatus and a photographic lens and a means for controlling a movement of the lens in response to signals which are outputted by the automatic focusing apparatus.

2. Description of the Related Art

There are various kinds of camera having an automatic focusing apparatus. Among these cameras, a camera having a "zone focus" type focus adjusting apparatus can be categorized as one type of the automatic focusing camera. As a lens driving system of the "zone focus" type focusing camera, the below-mentioned mechanisms are well-known and utilized for the camera at the moment.

(1) A mechanism is that a lens frame supporting a photographic lens is driven by pre-charged force when locking of the lens frame is released, associated with shutter releasing operation.

(2) A mechanism is that the lens frame is driven by force which is transmitted through a shutter releasing button itself on shutter releasing.

The above-mentioned mechanism (1) requires a charging mechanism, so that the lens driving system is complicated due to interconnection with the charging mechanism and becomes costly.

On the other hand, the above-mentioned mechanism (2) has the improved mechanism as compared with the mechanism (1). For instance, the lens driving system, which has been disclosed in Japanese Laid-open Patent Publication No. 61926/1979 and corresponding U.S. Patent No. 4,148,574, issued on Apr. 10, 1979, operates as follows. At an initial state (non-operating state of a camera) the lens support is positioned and retained at a "far" position (a position of the lens focusing on the subject to be photographed located at a certain position relatively far away from the camera) by being urged by a spring and, then the lens is pushed forward to a "near" position by the lever connected with a shutter releasing button when it is depressed. Furthermore, when the enclosed automatic focusing apparatus outputs the signal showing a "far" range, an electromagnet is excited and the lever is attracted to the electromagnet, and then the lever transmitting its motion to the lens support is arrested. That is, the photographic lens is retained at its initial position ("far" position). The lens driving system disclosed by the abovementioned Publication is so designed that the lens moves for focus adjusting only at the time when the subject to be focused exists within the "near" range (area which is relatively close to the camera). In addition to the above, moving of the lens is associated with the motion of the lever actuated manually by the shutter releasing button.

The following introduced system as another example has been disclosed in Japanese Laid-open Patent Publication No. 105712/1982. The system is almost similar to the system described in the above-mentioned publication. The mechanism is as follows. A lens is driven by a lever associated with a manual operation (a shutter releasing operation). When an automatic focusing device detects the subject to be photographed, which exists within the "far" range (area which is relatively far away from the camera), an electromagnet is excited, and a core is pushed out by virtue of the excited electromagnet, so that a lens support itself is arrested by the core of the electromagnet.

The common feature between the above-mentioned arts is that the movement of the lens is associated with the motion of the manual depressing operation given to the shutter releasing button. In this case, the depressing force at the shutter releasing button increases remarkably and the depressing operation makes a photographer feel heavy. Moreover, this system urges a photographer to depress continuously a shutter releasing button after completion of the exposure operation.

Accordingly, the above-mentioned systems for moving the lens must have problems to be solved, respectively.

SUMMARY OF THE INVENTION

The invention has been made in view of the above-mentioned problems. An essential object of the present invention is to provide an improved lens driving system, carrying out automatically a series of lens movement without any manual operation, i.e., drawing out the photographic lens which is supported by the lens frame first, and after that, holding the lens frame at its appointed position during a duration of exposure, then after completion of exposure, drawing in the lens frame to its initial position.

In accomplishing this object, according to one preferred embodiment of the present invention, there is provided an improved lens driving system for automatic focusing zone focus camera, which comprises an automatic focusing apparatus which generates two focus detecting informations by outputting focus detecting signals, depending on a distance between a camera and a subject to be photographed, a photographic lens which is supported so as to move between a first focusing position and a second focusing position, both of which locate, respectively, along an optical axis and are, respectively, corresponding to the focus detecting informations, and a control means for moving the lens to either the first focusing position or the second focusing position in response to the respective signals, the control means comprising, urging means for urging the lens toward the first focusing position, and lens moving means having an electromagnetic device which operates in response to a signal corresponding to one of the focus detecting informations, for moving the lens to the second focusing position against the urging force generated by the urging means when the electromagnetic device operates.

According to the above-mentioned construction of the lens driving system, at a non-operating state of the camera the photographic lens is always positioned and retained at the first focusing position of the lens. And, at an operating state of the camera, at least, one signal is transferred to the lens moving means, i.e., it is, for example, either the first signal or the second signal which are respectively corresponding to the first and second information, or it is just one signal corresponding to one of the focus detecting informations.

There are two ways, for example, available for the operation of the lens moving means. One is as follows. When the subject to be photographed is located within a "far" distance range, the automatic focusing apparatus detects the subject and outputs the first signal. On the other hand, when the subject to be photographed is located within a "near" distance range, the automatic focusing apparatus detects it and outputs the second signal. However, the lens moving means is so designed that it does not operate in response to the first signal but operates in response to the second signal.

The other is as follows. When the subject to be photographed is located within either the "far" range or the "near" range, the automatic focusing apparatus outputs a signal, and the lens moving means operates in response to the signal.

That is, while the lens is moved to the one direction by the electromagnetic device, the lens is moved to the other direction by force of the urging means. No matter which of the above-mentioned ways is selected, the lens (or the lens including the lens frame) is positioned and retained at its first focusing position in response to the first signal or the state not to be output a signal, and the lens is positioned and retained at its second focusing position in response to the second signal or the state to be output a signal. In the case of applying the above-mentioned way to an actual camera system, therefore, it is preferable on account of the reason described hereinafter that the first focusing position corresponding the subject to be focused corresponds to the "far" range as well as the second focusing position corresponds to the "near" range. Furthermore, it is preferable to actuate the automatic focusing apparatus by a shutter releasing button on a camera body, having a function which is generally used as a conventional manner, i.e. the half depressing and fully depressing operation of the shutter releasing button. To put it concretely, when the subject is located in the "far" distance range for the camera, the automatic focusing apparatus detects the distance between the camera and the subject in response to the half depressing operation and then outputs the corresponding signal, i.e., outputting the first signal or not outputting any signal. The electromagnetic device is actuated n response to a signal outputted by the automatic focusing apparatus, while the electromagnetic device is not actuated in response to the first signal, so that the lens is retained at the first focusing position where the lens is positioned by the force of the urging means. When the subject is located in the "near" distance range for the camera, the automatic focusing apparatus outputs the second signal with the above-mentioned operation of the shutter releasing button (the half depression). In this time, the electromagnetic device is actuated in response to this signal and the lens is moved to the second focusing position by the electromagnetic device. Consequently, the focusing adjustment of the lens is completed, so that the further depression (full depression of the shutter releasing button) makes the shutter release, and film exposure is completed. After completion of exposure, the next operation for preparing the photographing, for example, winding of the film, is carried out. It is also possible to release an operating condition of the electromagnetic device by the electric signal for carrying out such next operation. The electromagnetic device which is free from its operating condition by any means is returned to its initial state by the force of the urging means and, in addition, the lens is moved to the first focusing position, accordingly. That is to say, the lens returns to its initial position.

It would be apparent from the above-mentioned description that the present invention has the following advantages. According to the invention, the focusing adjustment of the photographic lens is automatically achieved without any manual operation. Furthermore, it is advantageous that a photographer is released from any burden caused with the shutter releasing operation of the camera. That is, it is not necessary for a photographer to hold depressing the shutter button by hand until completion of film exposure. Further advantage is that all operations such as drawing out the lens, holding the lens at the position where the lens has been drawn out, and drawing in the lens, are automatically carried out.

There is a further advantage that a number of the operation of lens driving from its initial position to the position where the lens is drawn out can be reduced. Because, in normally photographing, most of subjects to be photographed are located in the "far" distance range of the camera if the "far" distance range of the camera is set up by the zone in excess of 1.5 meters from the camera body and the "near" range of the camera is set up by the zone of 1.0 meter to 1.5 meters from the camera body. Consequently, it is desirable that the first focusing position of the lens, i.e., the position where the lens is drawn in, corresponds to the "far" distance range, so that the number of times for lens driving can be decreased, and it is possible to avoid wasting electricity of the stored battery, accordingly.

BRIEF DESCRIPTION OF THE DRAWINGS

This and other objects and feature of the present invention will become apparent from the following description taken in conjunction with the preferred embodiment thereof with reference to the accompanying drawings, in which:

FIG. 3 is a partially fragmental cross-sectional view of a lens driving system, and FIG. 4 is a side elevational view of a lens moving mechanism incorporating the lens driving system.

DETAILED DESCRIPTION OF THE INVENTION

Figure 1:
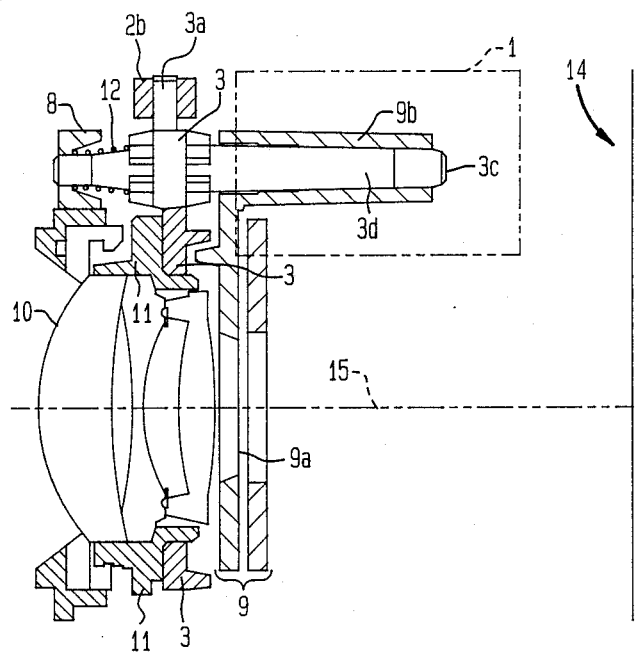
FIG. 1 is a partially fragmental cross-sectional view of a lens driving system according to one preferred embodiment of the present invention.

Before the description of the present invention proceeds, it is to be noted that like parts are designated by like reference numerals and symbols throughout the several views of the accompanying drawings.

Figure 2:
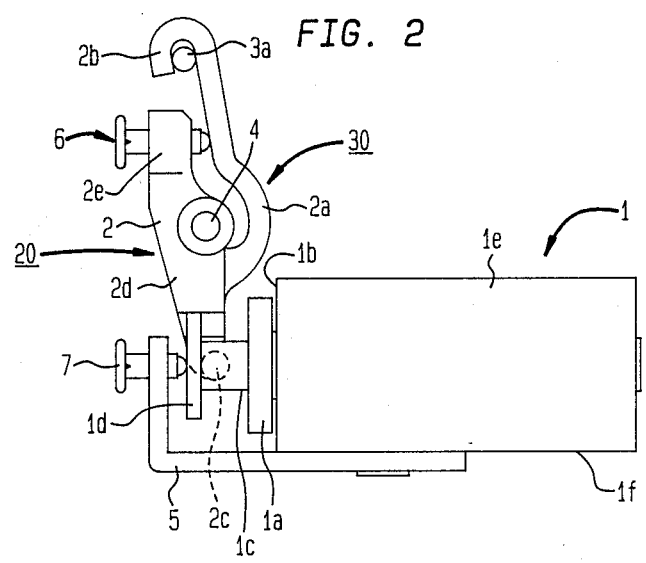
FIG. 2 is a side elevational view of a lens moving mechanism incorporating the lens driving system.

Referring now to the drawing, there are shown in FIG. 1, a lens driving system incorporating an automatic lens focusing system of a camera and shown in FIG. 2, a lens moving mechanism incorporating the above-mentioned lens driving system according to one embodiment of the present invention, which is arranged in a camera body. In FIG. 1, the reference numerals 15, 10 show an optical axis of the camera and a photographic lens, respectively. The photographic lens 10 is arranged to make a right angle with the optical axis 15, and a film plane which makes a right angle with the optical axis 15 is located at a certain position on the optical axis 15 behind the lens 10. The lens 10 is supported by a lens frame 11, and the lens frame 11 is so arranged as to be capable of moving backward and forward. The lens frame 11 is screwed to a lens frame holder 3 which holds the lens frame 11 behind it. The holder 3 has a shaft member 3d being almost parallel with the optical axis 15. A front end portion 3b and a rear end portion 3c of the shaft member 3d are supported by a holder bearing 8 and a sleeve 9b which is arranged along the optical axis 15 and is formed on a front plate 9a of a shutter block 9. The holder 3 which is supported by such a supporting construction becomes movable along the optical axis 15. Both of the holder bearing 8 and the shutter block 9 are screwed a fixed base plate which is not shown in the drawing. In addition, the above-mentioned lens frame holder 3 has a pin 3a which projects along the direction which makes a right angle with the optical axis 15. The pin 3a is connected with a lens moving mechanism which is described later. Around an outer surface of the front end portion 3b of the shaft member 3d, a coil spring 12 is arranged. One end of the coil spring 12 is supported at the holder bearing 8 and the other end of the spring 12 is supported at the holder 3, so that the holder 3 is always urged to the backward direction (to a right side direction in the drawing) of the camera by the spring 12. In other words, the holder 3 is urged to the direction to which the lens 10 is drawn in.

The aforementioned lens moving mechanism 20 by which the lens 10 is moved along the optical axis 15 comprises essentially an electromagnetic device 1 and a lens driving lever 2 which is connected with a movable member of the electromagnetic device 1, as shown in FIG. 2. The electromagnetic device 1 comprises essentially a solenoid 1e and a plunger 1c as main member. The plunger 1c is arranged in parallel with the optical axis 15 and, in addition, a stopper plate 1d and an attracted ferrous plate 1a which is located on the side of the solenoid 1e away from the stopper plate 1d are provided for the front end part of the plunger 1c. The attracted ferrous plate 1a is shaped circularly and is attached on the outer surface of the plunger 1c as well as with the fixed certain distance away from a front surface 1b of a case body 1f of the electromagnetic device 1. In front of the stopper plate 1d, a stopper bolt 7 which is screwed with an adjusting plate 5 secured to the case body 1'f with screws is arranged at the position which is almost coincided with the center of the axis of the plunger 1c. The stopper bolt 7 is so designed as to adjust a distance between the attracted ferrous plate 1a and the front surface 1b of the case body 1f by screwing stopper bolt 7 on or off. Accordingly, a projecting position of the plunger 1c can be adjusted by the stopper bolt 7. Moreover, the plunger 1c is connected with a lens driving lever 2 which comprises a lever body 2d and an arm portion 2a supported rotatably with a rotating shaft 4 provided for the fixed base plate. The arm portion 2a of the lens driving lever 2 is so formed that it has elasticity. Therefore, the arm portion 2a is more bendable than the lever body 2d. In addition, a top part 2b of the arm portion 2a is connected with the pin 3a fitted at the lens frame holder 3 as well as a lower end part 2c of the lever body 2d is connected with the stopper plate 1d provided for the plunger 1c. Furthermore, a focus adjusting screw 6 touching to the arm portion 2a is provided by screwing at an upper end part 2e of the lever body 2d in order that the top part 2b of the arm portion 2a may rotate around the rotating center of the rotating shaft 4.

The camera body is provided with an automatic focusing apparatus (not shown in the drawing) which is designated as the automatic distance measuring apparatus outputting two kinds of a signal, depending on a distance between the subject to be photographed and the camera, one of which is designated as "far" (the second signal) and the other of which is designated as "near" (the first signal). Accordingly, the above-mentioned electromagnetic device 1 is so designed as to be excited when the automatic focusing apparatus outputs the signal of "near".

According to the above-mentioned construction, the system operates as follows.

If the automatic focusing apparatus outputs the signal of "far", corresponding to one subject to be photographed at the state of lens (initial position of lens) as shown in FIGS. 1 and 2, the solenoid 1e maintains disexcited. Therefore, the attracted ferrous plate 1a remains at its initial position. That is, the urging force generated by the coil spring 12 operates toward the stopper bolt 7, so that the plunger 1c is being pressed to the stopper bolt 7 by the urging force through the lens driving lever 2.

If the automatic focusing apparatus outputs the signal of "near" corresponding to another subject, the solenoid 1e becomes excited, then the attracted ferrous plate 1a moves toward the front surface 1b of the case body 1f to overcome against the urging force of the coil spring 12 and is pressed at the front surface 1b. By this movement, the lens driving lever 2 is rotated counterclockwise. At the same time, the pin 3a of the lens frame holder 3 is pushed forward (in the direction of the left side in the drawing), i.e., the lens frame 11 is drawn out in the direction of the camera front. In connection with exciting the solenoid 1e it is desirable to take a following manner after completion of film exposure. For example, after completion of exposure, the solenoid is so designed that it is controlled to be disexcited by the signal of shutter closing. If so designed, the lens frame 11 returns to its initial position by the coil spring 12, so that the stopper plate 1d touches to the tip end of the stopper bolts 7. Then, the lens frame 11 is retained at that position where the stopper plate 1d is stopped by the stopper bolt 7.

Regarding the focus adjustment in the manufacturing process in the embodiment, it is possible simply as well as securely by the following manner. The focus adjustment can be done by the following two processes, one of which is the adjustment of the lens driving stroke and the other of which is the so-called lens-back adjustment.

(1) Adjustment of the lens driving stroke

In the space between the attracted ferrous plate 1a and the front surface 1b of the case body 1f of the electromagnetic device 1, the plate having thickness equivalent to the predetermined quantity which is converted into the stroke of the plunger 1c by multiplying the stroke of the lens driving lever by the lever ratio of the lens driving lever 2, may be inserted, and then, the stopper bolt 7 is screwed in as far as the bolt 7 touches to the stopper plate 1d. The quantity of the lens driving stroke can be determined by taking such a manner.

(2) Lens-back adjustment (a) Firstly, fixing the lens driving lever 2 in order that the lens 10 may be located under either the lens drawing-in state or the lens drawing-out state.

(b) Secondly, bending gradually the arm portion 2a of the lens driving lever 2 by screwing the focus adjusting screw 6 in.

(c) Third, determining the most suitable focusing position of the lens 10 by using a collimator since a value of lens-back varies in proportion to bending the arm portion 2a.

It would become apparent from the above-mentioned description that the lens driving system having the structure of the above-mentioned embodiment is more advantageous than a prior art. One of the advantages is that no charge mechanism which is provided for charging the lens driving mechanism is required. Therefore, the construction relating to its mechanism in the camera body becomes simple, so that it is enable the camera body to become smaller. Consequently, it is possible to reduce the cost of the camera. This is another advantage. Furthermore, as compared to the aforementioned two prior arts which are similar to the above-mentioned embodiment in view of using the electromagnetic device, the mechanism for drawing the lens out in the prior art is the lever linkage structure which is engaged with a manual hand operation and the electromagnetic device is for use in arresting the motion of the lens driving in response to the signal which is output by the automatic focusing apparatus, for example, arresting the motion of the lens driving lever, or arresting the motion of the lens frame. Therefore, when drawing the lens out, the manual hand operation is engaged with driving of the lens directly whichever the structure could be taken. Consequently, accuracy about driving of the lens can be hardly maintained. Moreover, at the position where the lens is drawn out, positioning of the lens must be retained until exposure of film. Accordingly, the shutter release operation of the camera forces a photographer to withstand a sort of burden. However, in this embodiment, there are no disadvantages relating to the above-mentioned because all operation concerning lens driving can be automatically carried out by both the coil spring 12 and the electromagnetic device 1.

In addition to the above, the embodiment is capable of minimizing the space between the attracted ferrous plate 1a and the front surface 1b of the case body 1f since the over-stroke (a certain quantity of the stroke which is requested for adjusting focusing position of the lens) is not requested for the plunger 1c because of availability of the stroke adjusting mechanism for lens driving.

With respect to the stroke-adjustment of the quantity for lens driving, any other structures except the above-mentioned one are available, by providing a simple construction. One modification for the above-mentioned embodiment is described hereinafter. The following modification is mostly same as the embodiment described above, therefore, a different reference numeral in the following modification designates a different member, otherwise, the identical members in the above-mentioned embodiment have the same reference numerals.

Figure 3:
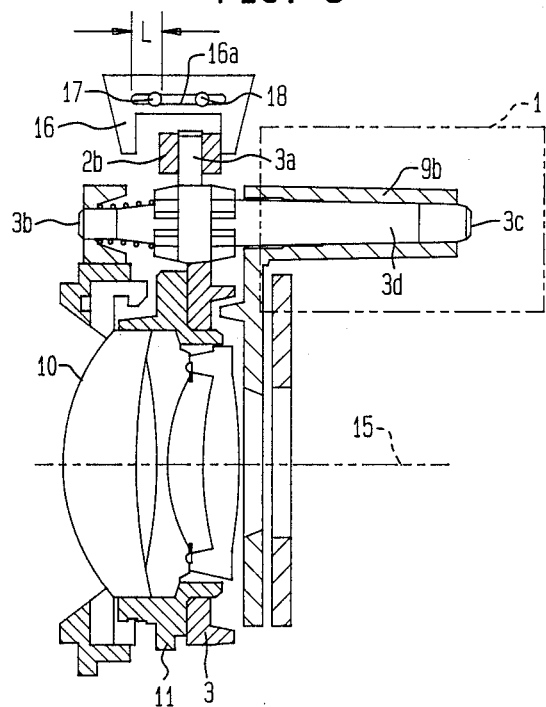
FIGS. 3 and 4 respectively show one modification of the above-mentioned embodiment.
Figure 4:
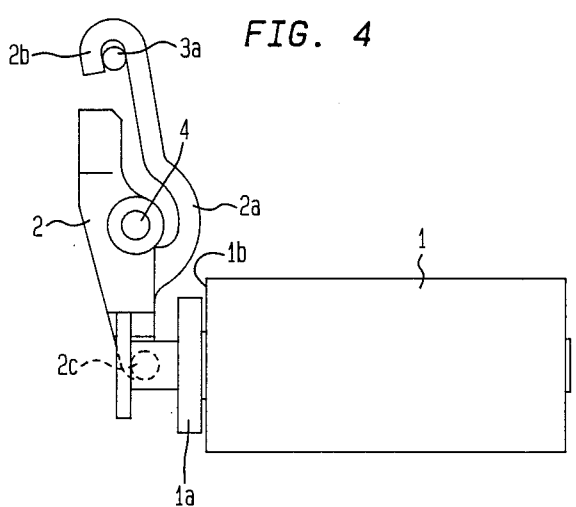

Referring now to FIGS. 3 and 4, there is shown a modification of the lens driving system according to the present invention. In FIG. 3, a member 16 for adjusting a stroke is arranged at the position, wherein the member 16 can hold the upper end portion 2b of the lens driving lever 2. The member 16 is fixed to the fixed base plate (not shown in the drawing) with screws 17, 18 under such a manner that a space (L) between the member 16 and the corresponding becomes equal to the quantity of lens driving. The screws 17, 18 are inserted into a slotted hole 16a of the member 16.

According to the construction described above, the quantity of lens driving is limited by the space (L). And for lens-back adjustment, it is carried out by the following; the screws 17, 18 are loosened, and then, the member 16 is moved along the slotted hole 16a. Accordingly, the stopper bolt 7 and the focus adjusting pin 6 described in the embodiment are not required. On the other hand, the moving stroke of the attracted ferrous plate 1a must include the over-stroke (ΔL) for the stroke adjustment, additionally because the presumed extra quantity (ΔL) for the stroke adjustment must be required for determining a suitable focusing position of the lens 10 after the upper end portion 2b touches to the member 16. Furthermore, for the lens-back adjustment, the extra quantity (±ΔLb) for the stroke adjustment is required. Therefore, in this modification, the attracted ferrous plate 1a must have the quantity as the over-all stroke which is described by a quantity: L+ΔL+2ΔLb. While this modification is suitable for a solenoid which has a sufficient enough of the attraction force, the aforementioned embodiment is suitable for a solenoid which has the comparatively less attraction force.

The above-mentioned embodiment and modification, respectively, have the following advantages in addition to the advantages described above. An advantage is that the adjustment work of the stroke adjustment and the focusing adjustment can be performed under the condition that a front cover of the camera is taken out. A further advantage is that it is possible the initial position of the lens, i.e., the disexciting condition of the solenoid, corresponds to the focusing position of the lens on the side of the "far" range. Therefore, taking into consideration that photographing is mostly carried out in this zone, i.e., the "far" range, a number of times of the excitement of the solenoid can be reduced and the life of the battery stored in the camera can be extended, accordingly.

Figure 5:
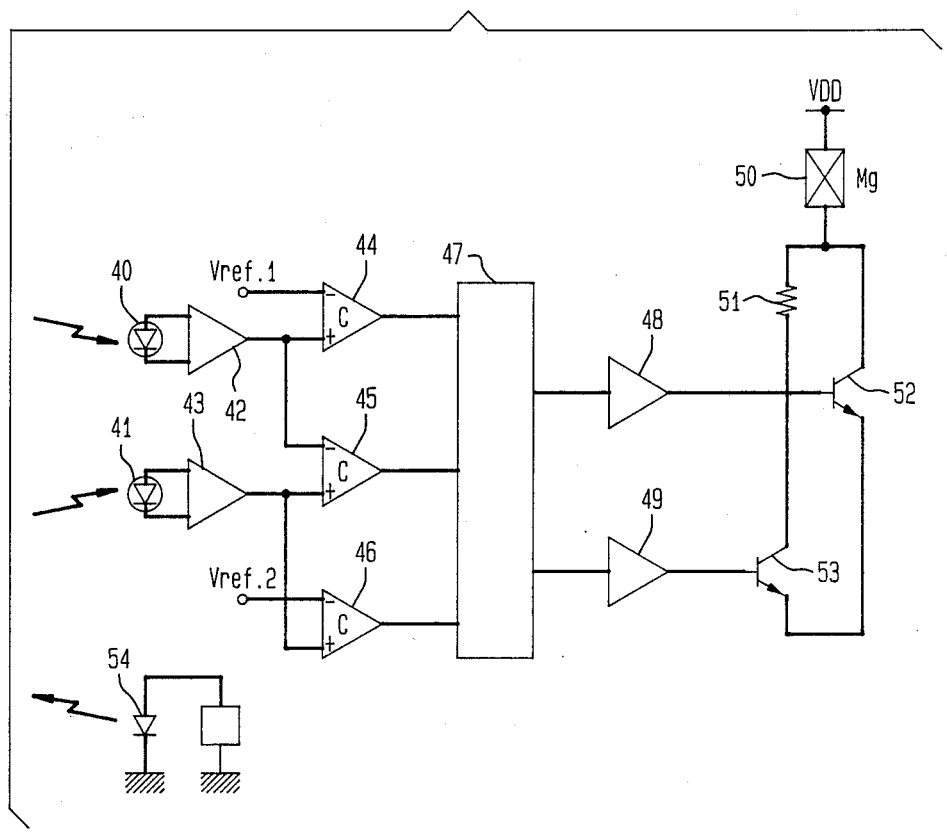
FIG. 5 is a block diagram showing a driving circuit for automatic focusing and a driving circuit for the electromagnetic device.

FIG. 5 shows a driving circuit for achieving the embodiment and/or the modification described above. This is one of the example about the circuit, so that there may be any other circuits available.

In FIG. 5 of the drawings, the reference numeral 54 designates LED (light emitting diode). The infrared light emitted from the LED 54 reflects at the subject to be photographed and the reflected light is received with receiving elements 40, 41 which are of a photodiode. This circuit makes automatic focusing of the active type. The reflected light received with each photodiode 40, 41 is converted into an electric current by the respective photodiodes 40, 41. The electric signal created by the photoelectric conversion is input to respective amplifiers 42, 43 and is amplified by the respective amplifiers 42, 43. Each amplified signal is input to a discriminating circuit 47 via a respective integrating circuit 47 via respective integrating capacitors 44, 45, 46. At the discriminating circuit 47, the relative relationship between the camera and the subject to be photographed is discriminated. That is, it is decided whether the subject is located close to the camera or is located far away from the camera. If it is decided that the subject is located far away from the camera, both of the amplifiers 48, 49 receive a "Low" signal, for example, "OFF" signal, and if decided that the subject is located close to the camera, both of the amplifiers 48, 49 receive a "High" signal, for example, "ON" signal. Furthermore, a driving circuit 51, 52, 53 for the solenoid 50 (equivalent to the numeral 1e in FIG. 2 or FIG. 4) is actuated only when the "High" signal is output by the discriminating circuit 47. Then, the solenoid 50 is excited and the attracted ferrous plate 1a is attracted. In the driving circuit described above, the reference numeral 51, designates a resistor and both of reference numerals 52, 53 designate transistors for solenoid driving.

The above-mentioned driving circuit for automatic focusing and the electromagnetic device operates with the operation of the shutter releasing button (not shown in the drawing) on the camera body. That is, when the button is half depressed, in other words, turning on the first switch (not shown in the drawing), the components from the photodiodes 40, 41 to the discriminating circuit 47 in the driving circuit is actuated and the decision about "far" and/or "near" is performed. After that, when the button is fully depressed, i.e., it means the second switch (not shown in the drawing) is turned on, the discriminating circuit 47 outputs the corresponding signal in accordance with the subject position from the camera. In response to the corresponding signal, the voltage is applied to the amplifiers 48, 49, respectively. When the amplifiers 48, 49 is actuated, the driving circuit for the solenoid 50 operates in response to the applied voltage and the photographic lens 10 is driven by means of the solenoid 50. And the further steps follow. After releasing of the shutter is carried out, winding of film starts. And the amplifiers 48, 49 is to be reset by the signal of "winding film", whereby the applied voltage supplied to the driving circuit for the solenoid is stopped.

That is why it is desirable to make a reset circuit for the amplifiers 48, 49 so as to reset the amplifiers 48, 49 just as the above-described control. When the solenoid is disexcited, the attracted ferrous plate 1a is moved away from the solenoid 50 by the urging force of the coil spring 12 by which the lens frame holder 3 of the photographic lens 10 is urged.

Although the first and second signals which are corresponding to the distance between the subject to be photographed located away from the camera and the camera are output in the embodiment described herein, it is possible that just one signal, for example, the first signal, of the signals is output and the other is not output by means of opening the circuit, i.e., the state not having any other specific signals to be output is created in the circuit. In this case, the state having no specific signals turns into the information which shows the other signal, for example, the second signal.

Although the present invention has been fully described by way of example with reference to the accompanying drawings, it is to be noted, here, that various changes and modifications will be apparent to those skilled in the art. Therefore, unless otherwise such changes and modifications depart from the scope of the present invention, they should be construed as included therein.

What is claimed is:

1. A lens driving system for an automatic focusing zone focus camera adjustable in two zones, comprising:
   an automatic distance measuring apparatus which generates focus detecting informations by outputting focus detecting signals which depend on a distance between the camera and a subject to be photographed;
   a photographic lens which is supported so as to move between a first focusing position and a second focusing position, both of which are located along an optical axis and correspond to said focus detecting informations; and
   control means for moving said lens between said first focusing position and said second focusing position in response to said responsive focus detecting informations;
   said control means comprising,
   urging means for urging said lens toward said first focusing position, and
   lens moving means including an electromagnetic device which operates in response to a signal corresponding to said focus detecting informations, for moving said lens towards said second focusing position against the urging force generated by said urging means;
   said electromagnetic device comprising a plunger and a solenoid and being so designed that said electromagnetic device is excited when said signal corresponding to one of said focus detecting informations is output, while said electromagnetic device is not excited when a predetermined signal is output, whereby said lens, when drawn out to said second focusing position, moves automatically to said first focusing position by force of said urging means.

2. A lens driving system according to claim 1, wherein said plunger moves in parallel with said optical axis.

3. A lens driving system according to claim 1, wherein said lens moving means comprises:
   a first adjusting mechanism for adjusting an operating stroke of said plunger between a projection position and a recession position;
   a lens moving mechanism for moving said lens in response to movement of said plunger between said projection position and said recession position; and
   a second adjusting mechanism for adjusting a position of said lens.

4. A lens driving system according to claim 3, wherein said lens moving mechanism includes a lever for transmission of a movement of said plunger, said lever having a rotating shaft arranged at a right angle to said optical axis, one end of said shaft being connected with said plunger and the other end of said shaft being connected with a photographic lens frame holder by which said lens is moved along said optical axis.

5. A lens driving system for an automatic focusing zone focus camera adjustable in two zones comprising:
   an automatic distance measuring apparatus which generates two focus detecting informations, one of which is generated by outputting a focus detecting signal and the other of which is represented by not outputting said focus detecting signal, depending on a distance between the camera and a subject to be photographed;
   a photographic lens which is supported so as to move between a first focusing position and a second focusing position, both of which are located along an optical axis and correspond respectively to said focus detecting informations; and
   control means for moving said lens to either said first focusing position or said second focusing position in response to said respective focus detecting informations;
   said control means comprising,
   urging means for urging said lens toward said first focusing position, and
   lens moving means having an electromagnetic device which operates in response to a signal corresponding to one of said focus detecting informations, for moving said lens to said second focusing position against the urging force generated by said urging means;

said electromagnetic device comprising a plunger and a solenoid and being so designed that said electromagnetic device is excited in response to one of said focus detecting informations, while said electromagnetic device is not excited in response to the other of said focus detecting informations, whereby said lens, when drawn out to said second focusing position, moves automatically to said first focusing position by force of a compression spring which is identified as said urging means.

6. A lens driving system according to claim 5, wherein said electromagnetic device is so arranged that said plunger moves in parallel with said optical axis.

7. A lens driving system according to claim 5, wherein said lens moving means comprises:
   a first adjusting mechanism for adjusting an operating stroke of said plunger between a projection position and a recession position;
   a lens moving mechanism for moving said lens in response to movement of said plunger between said projection position and said recession position; and
   a second adjusting mechanism for adjusting a position of said lens which is positioned by said lens moving mechanism.

8. A lens driving system according to claim 5, wherein said lens moving mechanism includes a lever for transmission of a movement of said plunger, said lever including a rotating shaft which is at a right angle to said optical axis, one end of said shaft being connected with said plunger and the other end of said shaft being associated with a photographic lens frame holder by which said lens is moved along said optical axis.

9. A lens driving system for an automatic focusing zone focus camera adjustable in two zones comprising:
   an automatic distance measuring apparatus which generates two focus detecting informations, one of which is generated by outputting a focus detecting signal and the other of which is represented by not outputting said focus detecting signal, depending on a distance between the camera and a subject to be photographed;
   a photographic lens which is supported so as to move between a first focusing position and a second focusing position, both of which are located along an optical axis and correspond respectively to said focus detecting informations; and
   control means for moving said lens to either said first focusing position or said second focusing position in response to said respective focus detecting informations;
   said control means comprising,
   urging means for urging said lens toward said first focusing position, and
   lens moving means for moving sad lens to said second focusing position against the force of said urging means, said lens moving means having an electromagnetic device which operates in response to said focus detecting signal;
   said electromagnetic device comprising a plunger and a solenoid and being so designed that said electromagnetic device is excited in response to one of said focus detecting informations; said lens, when drawn out to said second focusing position, moving automatically to said first focusing position by force of said urging means.

10. A lens driving system according to claim 9, wherein said plunger moves in parallel with said optical axis.

11. A lens driving system according to claim 9, wherein said lens moving means comprises:
   a first adjusting mechanism for adjusting an operating stroke of said plunger between a projection position and a recession position;
   a lens moving mechanism for moving said lens in response to movement of said plunger between said projection position and said recession position; and
   a second adjusting mechanism for adjusting a position of said lens.

12. A lens driving system according to claim 11, wherein said lens moving mechanism includes a lever for transmission of a movement of said plunger, said lever including a rotating shaft arranged at a right angle to said optical axis, one end of said shaft being connected with said plunger and the other end of said shaft being associated with a photographic lens frame holder.

13. A lens driving system for an automatic focusing zone focus camera adjustable in two zones comprising:
   an automatic distance measuring apparatus which generates two focus detecting informations by outputting focus detecting signals, depending on a distance between the camera and a subject to be photographed;
   a photographic lens which is supported so as to move between a first focusing position and a second focusing position, both of which are located along an optical axis and correspond respectively to said focus detecting informations; and
   control means for moving said lens to either said first focusing position or said second focusing position in response to said respective focus detecting informations;
   said control means comprising,
   a compression spring for urging said lens toward said first focusing position, and
   lens moving means having an electromagnetic device which operates in response to a signal corresponding to one of said focus detecting informations, for moving said lens to said second focusing position against the urging force generated by said urging means when said electromagnetic device operates;
   said electromagnetic device comprising a plunger and a solenoid and being so designed that said electromagnetic device is excited when said signal corresponding to one of said focus detecting informations is output, while said electromagnetic device is not excited when a predetermined signal is output, whereby said lens, when drawn out to said second focusing position, moves automatically to said first focusing position by force of said compression spring; said electromagnetic device being so arranged that said plunger moves in parallel with said optical axis.

14. A lens driving system for an automatic focusing zone focus camera adjustable in two zones comprising:
   an automatic distance measuring apparatus which generates two focus detecting informations by outputting focus detecting signals, depending on a distance between the camera and a subject to be photographed;
   a photographic lens which is supported so as to move between a first focusing position and a second focusing position, both of which are located along an optical axis and correspond respectively to said focus detecting informations; and control means for moving said lens to either said first focusing position or said second focusing position in response to said respective focus detecting informations;

said control means comprising, a compression spring for urging said lens toward said first focusing position, and lens moving means having an electromagnetic device which operates in response to a signal corresponding to one of said focus detecting informations, for moving said lens to said second focusing position against the urging force generated by said urging means when said electromagnetic device operates;

said electromagnetic device comprising a plunger and a solenoid and being so designed that said electromagnetic device is excited when said signal corresponding to one of said focus detecting informations is output, while said electromagnetic device is not excited when a predetermined signal is output, whereby said lens, when drawn out to said second focusing position, moves automatically to said first focusing position by force of said compression spring;

said lens moving means comprising:

a first adjusting mechanism for adjusting an operating stroke of said plunger between a projection position and a recession position;

a lens moving mechanism for moving said lens, in response to movement of said plunger between said projection position and said recession position; and a second adjusting mechanism for adjusting a position of said lens which is positioned by said lens moving mechanism.

15. A lens driving system for an automatic focusing zone focus camera adjustable in two zones comprising:

an automatic distance measuring apparatus which generates two focus detecting informations by outputting focus detecting signals, depending on a distance between the camera and a subject to be photographed;

a photographic lens which is supported so as to move between a first focusing position and a second focusing position, both of which are located along an optical axis and correspond respectively to said focus detecting informations; and control means for moving said lens to either said first focusing position or said second focusing position in response to said respective focus detecting informations;

said control means comprising;

a compression spring for urging said lens toward said first focusing position, and lens moving means having an electromagnetic device which operates in response to a signal corresponding to one of said focus detecting information, for moving said lens to said second focusing position against the urging force generated by said urging means when said electromagnetic device operates;

said electromagnetic device comprising a plunger and a solenoid and being so designed that said electromagnetic device is excited when said signal corresponding to one of said focus detecting informations is output, while said electromagnetic device is not excited when a predetermined signal is output, whereby said lens, when drawn out to said second focusing position, moves automatically to said first focusing position by force of said compression spring; said lens moving mechanism including a lever for transmission of a movement of said plunger, said lever including a rotating shaft arranged at a right angle to said optical axis, one end of said shaft being connected with said plunger and the other end of said shaft being associated with a photographic lens frame holder by which said lens is moved along said optical axis.

* * * * *